(12) United States Patent
Honda et al.

(10) Patent No.: US 8,122,934 B2
(45) Date of Patent: Feb. 28, 2012

(54) MOLD FOR FORMING CAST RODS, CASTING APPARATUS, AND PRODUCTION METHOD OF CAST RODS

(75) Inventors: Kazuyoshi Honda, Osaka (JP); Yuma Kamiyama, Kyoto (JP); Yasuharu Shinokawa, Osaka (JP)

(73) Assignee: Panasonic Corporation, Osaka (JP)

( * ) Notice: Subject to any disclaimer, the term of this patent is extended or adjusted under 35 U.S.C. 154(b) by 230 days.

(21) Appl. No.: 12/576,486

(22) Filed: Oct. 9, 2009

(65) Prior Publication Data

US 2010/0089544 A1    Apr. 15, 2010

Related U.S. Application Data

(60) Provisional application No. 61/104,413, filed on Oct. 10, 2008.

(51) Int. Cl.
| B22D 23/00 | (2006.01) |
| B22D 33/04 | (2006.01) |
| B22C 9/20  | (2006.01) |
| B29C 39/26 | (2006.01) |

(52) U.S. Cl. ........ 164/129; 164/137; 164/322; 164/335; 164/341; 164/342; 249/119

(58) Field of Classification Search .................. 164/129, 164/322, 335, 137, 339, 341, 342; 249/82, 249/119

See application file for complete search history.

(56) References Cited

U.S. PATENT DOCUMENTS 2,502,595 A  *  4/1950  Schermuly et al. ........... 249/119

FOREIGN PATENT DOCUMENTS

| JP | 59-129447 | 8/1984 |
| JP | 62-108515 | 5/1987 |
| JP | 62-270431 | 11/1987 |
| JP | 01-218741 | 8/1989 |
| JP | 04-200845 | 7/1992 |
| JP | 08-290233 | 11/1996 |
| JP | 10-182285 | 7/1998 |
| JP | 10-190025 | 7/1998 |
| JP | 2003-071544 | 3/2003 |
| WO | WO 03/068567 A1 | 8/2003 |

OTHER PUBLICATIONS

International Search Report issued in corresponding PCT International Application No. PCT/JP2009/005207, mailed Dec. 8, 2009.

* cited by examiner

Primary Examiner — Kevin P Kerns
(74) Attorney, Agent, or Firm — McDermott Will & Emery LLP

(57) ABSTRACT

Disclosed is a mold 10 for forming cast rods including: a segment assembly 12 including a plurality of segments 14 being placed side by side, and a plurality of cavities 26 extending along a longitudinal direction 16; and clamping means (18 to 21) for clamping the segment assembly 12 in directions orthogonal to the longitudinal direction 16. The mold 10 has one or more cavity-forming portions 28 each forming a part of one of the peripheral surfaces of the cavities 26. Each cavity 26 is formed by a combination of two or more segments 14, and at least one of the plurality of segments 14 has two or more cavity-forming portions 28.

23 Claims, 9 Drawing Sheets

F I G. 3A
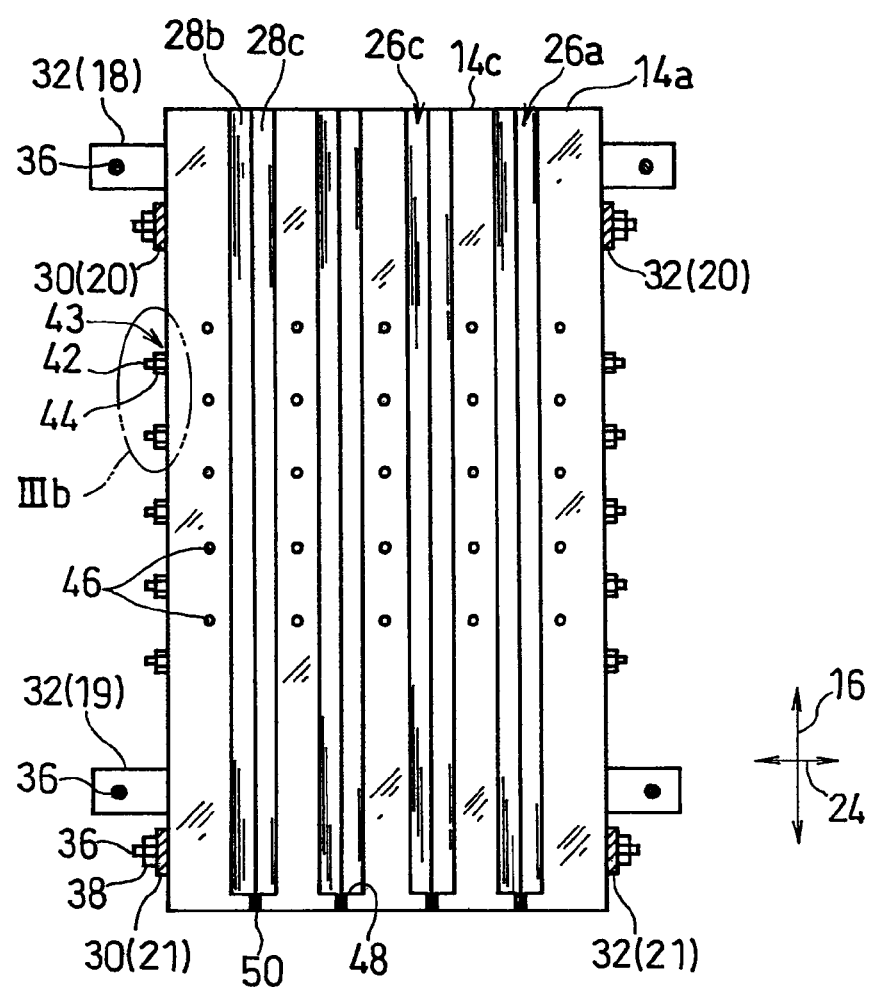

F I G. 3B
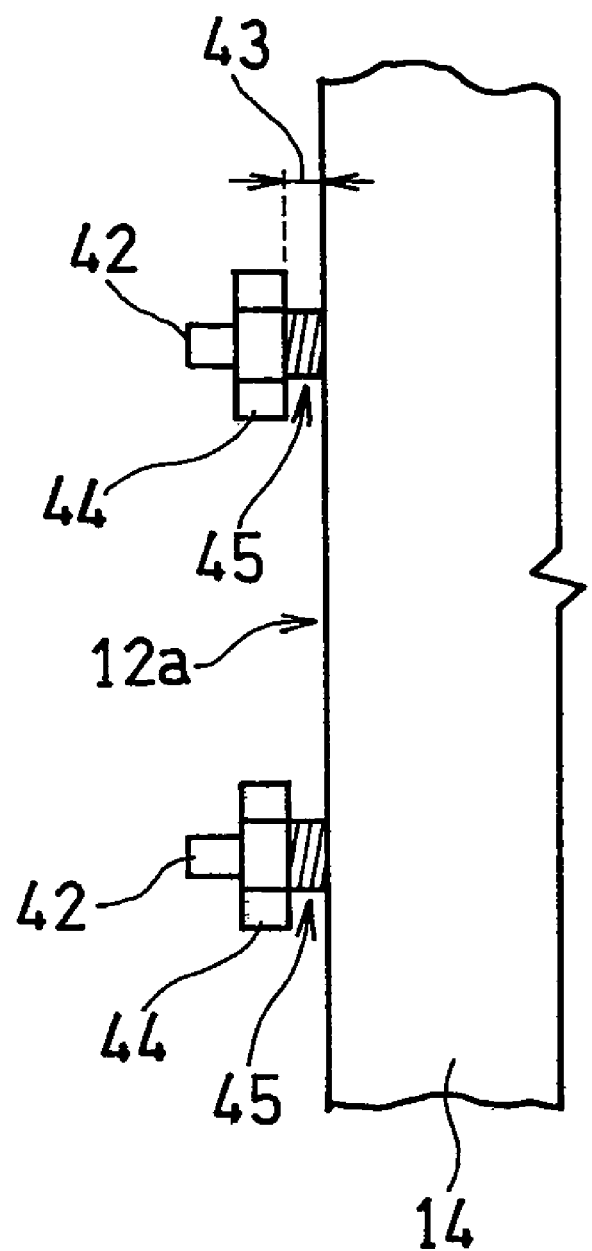

MOLD FOR FORMING CAST RODS, CASTING APPARATUS, AND PRODUCTION METHOD OF CAST RODS

RELATED APPLICATIONS

This application claims the benefit of U.S. Provisional Application No. 61/104,413, filed on Oct. 10, 2008, the disclosure of which Application is incorporated by reference herein.

FIELD OF THE INVENTION

The present invention relates to a mold and a casting apparatus for producing cast rods, and a production method of cast rods.

BACKGROUND OF THE INVENTION

In recent years, for producing various devices, thin film formation technologies have been widely employed. For example, for solar cells and lithium ion batteries, there has been attempted to use silicon thin films. Such use of thin films is important not only in view of improvement in functionality and reduction in size of devices but also in view of conservation of global environment, for example, conservation of resources, reduction in power consumption, and the like. Under these circumstances, the improvement in productivity and stability of thin film formation and the reduction in costs have been required.

In improving the productivity of thin films, a technology that enables continuous film formation for a long duration of time is indispensable, and for vacuum vapor deposition, a continuous supply of a material for forming a thin film to an evaporation source has been required. However, the continuous supply of a material for forming a thin film involves possibilities that the temperature of the evaporation source and the evaporation rate may fluctuate, adversely affecting the stability of the film formation.

As a solution for suppressing the fluctuation in temperature of the evaporation source that occurs in association with the continuous supply of a material for forming a thin film, a method of melting a material for forming a thin film beforehand and supplying the material in a droplet state to the evaporation source has been known. In such a supplying method, for allowing the material to melt quickly, it is beneficial to use a material having a small cross section and having a large ratio of the length to the diameter or width. Specifically, the material for forming a thin film preferably is a rod-shaped member having a width (or a diameter) of about 30 to 100 mm, and a ratio (H/D) of length H to width (or diameter) D of about 10 to 30.

As a method of producing a material for forming a thin film, such as silicon, into a rod-shaped member, a casting method is effective.

However, for example, silicon expands when solidified since the density of solid phase thereof at room temperature is small as compared to the density of liquid phase thereof at a temperature close to the solidification point. This results in various problems such as impossibility of removal of the cast silicon from the mold and breakage of the mold due to the stress during solidification. Even if the breakage of the mold is avoided, there is another problem in which the cast rod of silicon is broken inside the mold, since the cast article is a rod-shaped member (a cast rod) whose strength in the direction orthogonal to the longitudinal direction (i.e., in the diameter direction) is not strong.

Patent Document 1 suggests an integrated mold for casting polycrystal silicon ingot, the mold being provided with a predetermined upward enlarging taper in its sidewall. Patent Documents 2, 3 and 4 disclose assembled molds for casting silicon.

Patent Document 5 discloses a mold for continuous casting including a movable die comprising shiftable elements and fixed elements secured to a frame, wherein the boundary end surfaces of the shiftable elements are formed in parallel with the shifting direction thereof.

Patent Document 6 discloses an adjustable mold whose inner diameter is adjustable by hydraulic cylinders located in the radius direction of the casting cross section.

However, the integrated mold as disclosed in Patent Document 1 is characterized by producing an ingot having an increased base area and a reduced height, and therefore is not suitable for producing a cast rod. Further, in the case of the integrated mold, in general, it is necessary to destroy the mold to remove the cast article therefrom. This makes the recycling of the mold impossible, making it difficult to reduce the production costs of cast articles.

On the other hand, in the case of the assembled molds as disclosed in Patent Documents 2 to 4, it is not necessary to destroy the mold, to remove the cast article therefrom. However, the mold repeatedly undergoes stress associated with expansion during solidification, and thus the member for securing the mold and the like are easy to break, and the repeated use of the mold is difficult. Moreover, none of the assembled molds as disclosed in Patent Documents 2 to 4 are designed for producing a cast rod. If a cast rod is produced with the use of a material that expands when solidified, such as silicon, the cast rod may be broken inside the mold, reducing the yield.

Both of the molds as disclosed in Patent Documents 5 and 6 are designed for continuous casting. In the case of these molds for continuous casting, in order to allow the dies, through which a molten material passes continuously while cooled, to be held in contact with the cast piece that will contract as cooled, the mold is merely provided with a mechanism for changing the diameter of the mold. Such a mold for continuous casting is not suitable for producing a cast rod having a large length as compared with the width (diameter).

Patent Document 1: Japanese Laid-Open Patent Publication No. Hei 10-190025
Patent Document 2: Japanese Laid-Open Patent Publication No. Sho 62-108515
Patent Document 3: Japanese Laid-Open Patent Publication No. Hei 10-182285
Patent Document 4: International Publication No. 2005/073129 Brochure
Patent Document 5: Japanese Laid-Open Patent Publication No. Hei 1-218741
Patent Document 6: Japanese Laid-Open Patent Publication No. Hei 4-200845

BRIEF SUMMARY OF THE INVENTION

In order to solve the above-discussed problems, an object of the present invention is to provide a mold for forming cast rods and a casting apparatus using the same, the mold capable of being used repeatedly in producing cast rods made of a material that expands when solidified as well as of capable of improving the efficiency and the yield in producing the cast rods.

Another object of the present invention is to provide a production method of cast rods for efficiently producing cast rods made of a material that expands when solidified.

A mold for forming cast rods of the present invention includes: a segment assembly including a plurality of segments each having a columnar shape and being placed side by side, and a plurality of cavities extending along a longitudinal direction of the segments; and a clamping means for clamping the segment assembly in a direction orthogonal to the longitudinal direction of the segments, wherein each of the plurality of segments has one or more cavity-forming portions each forming a part of one of the peripheral surfaces of the cavities, each of the cavities is formed by a combination of two or more of the segments, and at least one of the plurality of segments has two or more cavity-forming portions.

This mold for forming cast rods has a plurality of cavities. As such, a plurality of cast rods can be produced at a time, and therefore the production efficiency can be improved.

In the foregoing mold for forming cast rods, the cavities for forming cast rods are formed so as to extend along the longitudinal direction of the segments, by a combination of two or more of the plurality of segments each having a columnar shape and being placed side by side. In other words, each cavity serving as a space in which molten material is solidified and formed into a cast rod is formed by a combination of two or more segments and is divided into two or more along the longitudinal direction of the segments when the combined two or more segments are separated from each other.

With this configuration, when the molten material expands upon solidification, the internal dimensions of the cavities can become large by the combined segments being separated from each other. This makes it possible to reduce the stress applied to the segments in association with the expansion of the molten material, and prevent the damage to the mold for forming cast rods and the cast rods.

For this reason, according to the mold for forming cast rods of the present invention, in producing cast rods made of a material that expands when solidified, it is possible to achieve the repetitive use of the mold and the improvement in the efficiency and the yield in producing the cast rods, and to reduce the production costs of the cast rods.

A casting apparatus of the present invention includes: a melting furnace for preparing a molten material made of a material for forming cast rods; the mold for forming cast rods of the present invention; and a molten material pouring means for pouring the molten material into each of the cavities in the mold for forming cast rods from the melting furnace.

According to this casting apparatus, because of using the mold for forming cast rods of the present invention as the mold for forming cast rods, in producing cast rods made of a material that expands when solidified, it is possible to achieve the repetitive use of the mold and the improvement in the efficiency and the yield in producing the cast rods, and to reduce the production costs of the cast rods.

A production method of cast rods of the present invention includes the steps of: pouring a molten material of a metal or alloy having a density of solid phase at room temperature smaller than a density of liquid phase at a temperature close to a solidification point into each of the cavities in the mold for forming cast rods of the present invention; and solidifying the molten material.

According to this production method of cast rods, because of using the mold for forming cast rods of the present invention as the mold for forming cast rods made of a material that expands when solidified, it is possible to achieve the repetitive use of the mold and the improvement in the efficiency and the yield in producing the cast rods, and to reduce the production costs of the cast rods.

According to the present invention, in forming cast rods made of a material that expands when solidified, by casting a plurality of cast rods at a time, the production efficiency thereof can be improved. In addition, it is possible to prevent the mold for forming cast rods and the cast rods from being damaged by the expansion during solidification, which enables the achievement of the repetitive use of the mold and the improvement in the yield of the produced cast rods.

Therefore, according to the present invention, it is possible to reduce the production costs of cast rods made of a material that expands when solidified.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3A is a IIIa-IIIa sectional view of FIG. 2A;

FIG. 3B is a partially enlarged view of FIG. 3A;

DETAILED DESCRIPTION OF THE INVENTION

Figure 1:
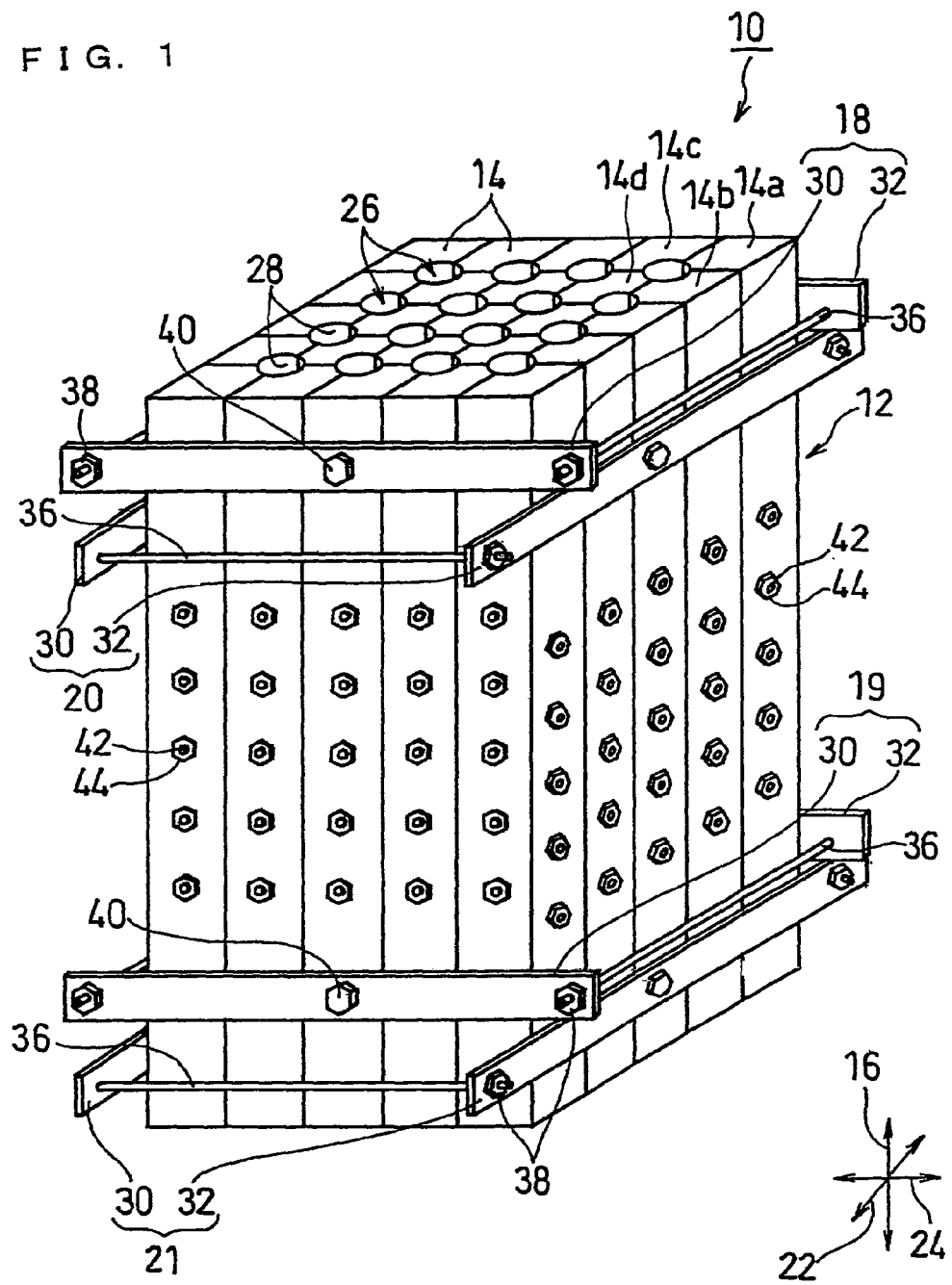
FIG. 1 is a perspective view illustrating an embodiment of the mold for forming cast rods of the present invention.
Figure 2A:
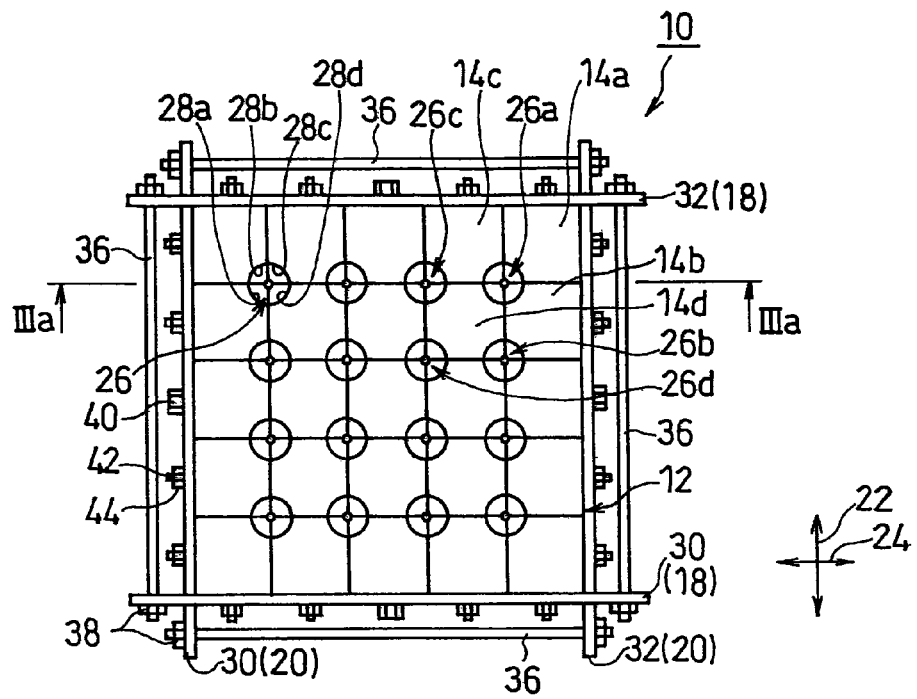
FIG. 2A is a plan view of the mold for forming cast rods of FIG. 1.
Figure 2B:
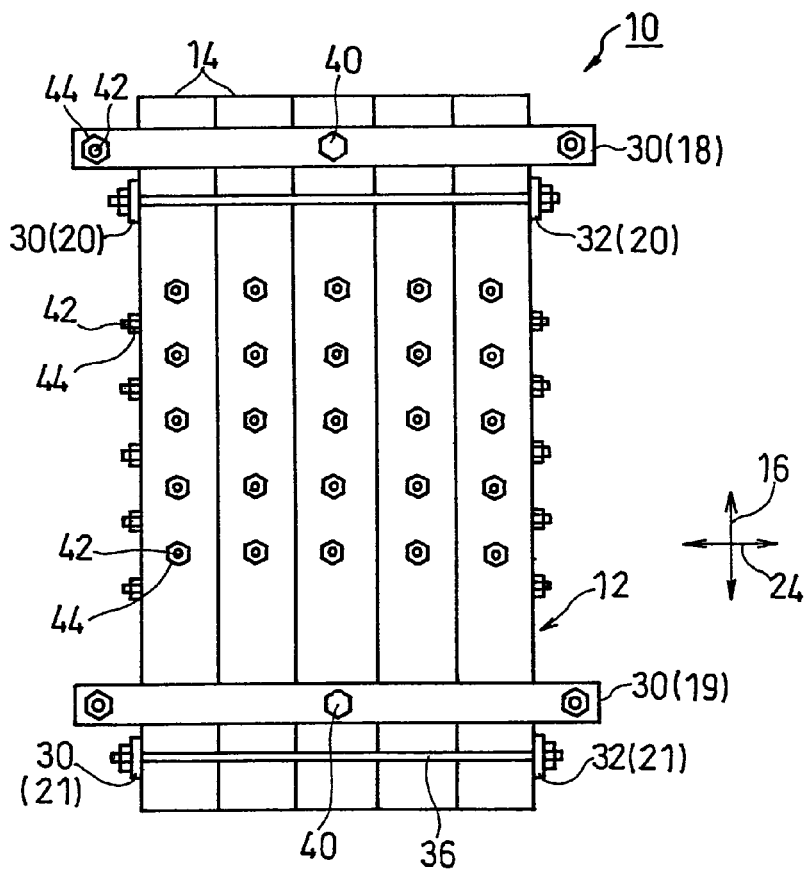
FIG. 2B is a front view of the mold for forming cast rods of FIG. 1.
Figure 2C:
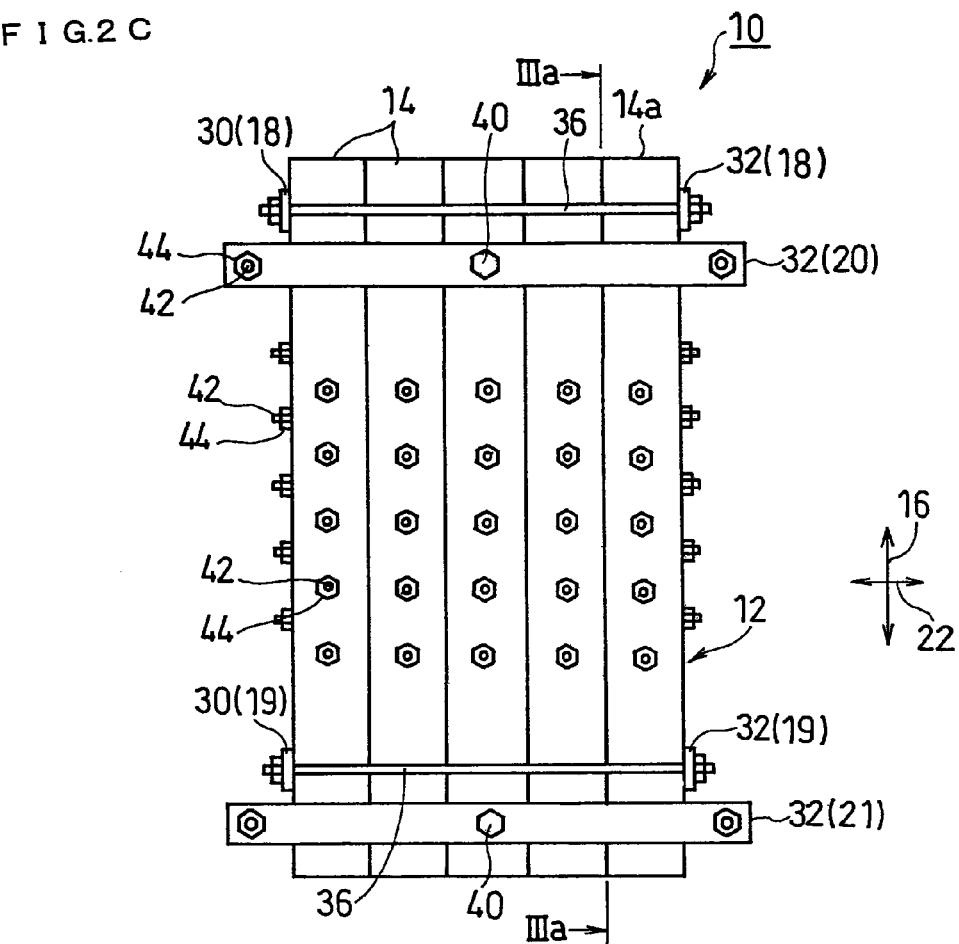
FIG. 2C is a right-side view of the mold for forming cast rods of FIG. 1.
Figure 2D:
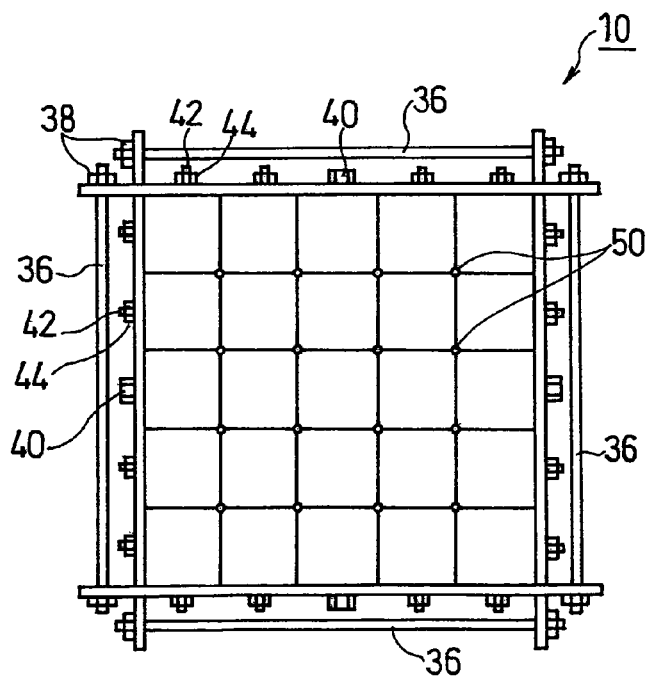
FIG. 2D is a bottom view of the mold for forming cast rods of FIG. 1.
Figure 4:
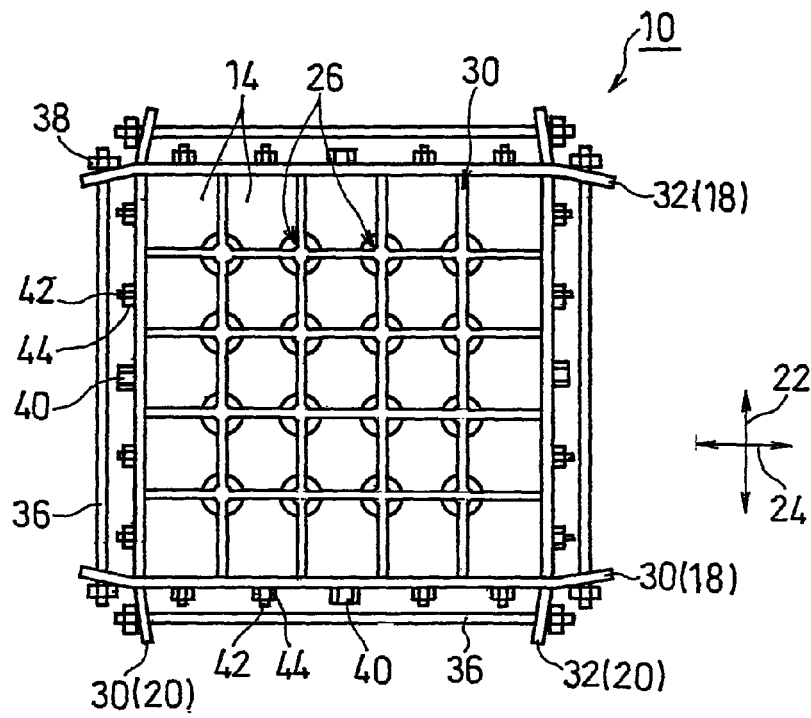
FIG. 4 is a plan view illustrating the state in which a molten material poured into the cavities for forming cast rods of FIG. 1 is solidified.

FIG. 1 is a perspective view illustrating an embodiment of the mold for forming cast rods of the present invention. FIG. 2A is a plan view of FIG. 1; FIG. 2B is a front view of FIG. 1; FIG. 2C is a right-side view of FIG. 1; and FIG. 2D is a bottom view of FIG. 1. FIG. 3A is a IIIa-IIIa sectional view of FIG. 2A and FIG. 2C, and FIG. 3B is a partially enlarged view of FIG. 3A. FIG. 4 is a plan view illustrating the state in which the segments constituting a segment assembly illustrated in FIG. 1 are spaced apart from each other in directions orthogonal to the longitudinal direction of each segment.

It should be noted that in the following description regarding the mold for forming cast rods and the casting apparatus, the description referring to the direction is based on the direction when the mold or the casting apparatus is placed horizontally, and specifically, based on the directional arrow shown in each figure.

With reference to FIG. 1 and FIGS. 2A to 2D, a mold 10 for forming cast rods includes a segment assembly 12 including a plurality of columnar segments 14 placed side by side, and clamping means (18 to 21) for clamping the segment assembly 12 in directions orthogonal to a longitudinal direction 16 of the segments 14. The mold 10 for forming cast rods is used by being mounted on a casting apparatus 90 (see FIG. 10) as described below.

The segment assembly 12 includes twenty five segments 14 in total. These twenty five segments 14 are placed side by side in rows such that five rows are each in a front-and-rear direction 22 and in a right-and-left direction 24.

The segment assembly 12 has sixteen cavities 26 in total each having a cylindrical shape and extending along the longitudinal direction 16 of the segment 14. The cavities 26 are aligned like a grid in plan view (see FIG. 2A), and aligned side by side when viewed from the front, back, and side.

Each cavity 26 is formed by combining four segments 14. Each segment 14 has a cavity-forming portion 28 forming a part of the peripheral surface of the cavity 26.

As for the four segments 14 forming one cavity 26, each of the cavity-forming portions (28a, 28b, 28c, and 28d) of the four segments corresponds to each one of four portions obtained by equally dividing the peripheral surface of the cavity 26 in the cross section orthogonal to the longitudinal direction 16 (see FIG. 2A).

In such a case where one cavity 26 is formed by four segments 14, and the cavity-forming portion 28 of each segment 14 is formed so as to equally dividing the cavity 26 into four, the segments 14 can be arranged in an efficient manner in fabricating the segment assembly 12.

In the above case, the segments 14 can be smoothly moved (see FIG. 4) when a stress acting to expand the cavities 26 in directions orthogonal to the longitudinal direction 16 is generated in association with the expansion of the molten material. By virtue of this, the stress generated can be immediately counterbalanced with the clamping force applied to the segment assembly 12 by the clamping means (18 to 21), and therefore the segments 14 and the cast rods can be prevented from being overstressed.

FIG. 4 shows the state in which the segments 14 are spaced apart from each other in directions orthogonal to the longitudinal direction 16, and gaps aligned like a grid in plan view are formed between the segments 14.

A first cavity 26a formed at the right rear corner of the segment assembly 12 is formed by a first segment 14a at the right rear corner of the segment assembly 12, a second segment 14b on the front of the first segment 14a, a third segment 14c on the left of the first segment 14a, and a fourth segment 14d on the front left of the first segment 14a (see FIG. 2A).

Here, the cavity formed in front of the first cavity 26a is referred to as a second cavity 26b; the cavity formed on the left of the first cavity 26a is referred to as a third cavity 26c; and the cavity formed on the front left of the first cavity 26a is referred to as a fourth cavity 26d.

The first segment 14a is provided with a cavity-forming portion forming one fourth of the peripheral surface of the first cavity 26a. The first segment 14a has only one cavity-forming portion 28 per one segment.

The second segment 14b is provided with a cavity-forming portion forming one fourth of the peripheral surface of the first cavity 26a, and a cavity-forming portion forming one fourth of the peripheral surface of the second cavity 26b. The third segment 14c is provided with a cavity-forming portion forming one fourth of the peripheral surface of the first cavity 26a, and a cavity-forming portion forming one fourth of the peripheral surface of the third cavity 26c. In short, the second segment 14b and the third segment 14c each have two cavity-forming portions 28 per one segment.

The fourth segment 14d is provided with a cavity-forming portion forming one fourth of the peripheral surface of the first cavity 26a, a cavity-forming portion forming one fourth of the peripheral surface of the second cavity 26b, a cavity-forming portion forming one fourth of the peripheral surface of the third cavity 26c, and a cavity-forming portion forming one fourth of the peripheral surface of the fourth cavity 26d. In short, the fourth segment 14d has four cavity-forming portions 28 per one segment.

As described above, the segments 14 constituting the segment assembly 12 include a segment provided with two or more cavity-forming portions 28, such as the second segment 14b, the third segment 14c, and the fourth segment 14d. In other words, in this case, one segment contributes to formation of two or more cavities.

Even in such a case, when a stress acting to expand the cavities 26 in directions orthogonal to the longitudinal direction 16 is generated in association with the expansion of the molten material, each of the segments 14 constituting the segment assembly 12 can be moved smoothly in the front-and-rear direction 22 and the right-and-left direction 24 (see FIG. 4). For this reason, even in the above case, the stress generated can be immediately counterbalanced with the clamping force applied to the segment assembly 12 by the clamping means (18 to 21), and therefore the segments 14 and the cast rods can be prevented from being overstressed.

For the purpose of make the internal dimensions of the cavities large when the molten material expands upon solidification, each of the cavities is formed by a combination of two or more segments.

Above all, in order to allow the segments 14 to move smoothly in association with the expansion of the molten material, it is preferable that each of the cavities is formed by a combination of three or more segments, and in a cross section orthogonal to the longitudinal direction, each of the cavity-forming portions of the segments forms less than one half of the peripheral surface of the cavity.

It is preferable that each of the cavity-forming portions of the segments equally divides the peripheral surface of the cavity in the cross section orthogonal to the longitudinal direction. This enables the segments to be arranged in an efficient manner in fabricating the segment assembly.

In view of arranging the segments in an efficient manner, one cavity is preferably formed of three, four, or six segments, and more preferably formed of four segments.

The cases where the cavities formed by a combination of three segments and a combination of six segments are described below as other embodiments (see FIGS. 8 and 9).

The shape of the cavities 26 can be selected suitably for an intended shape of the cast rods. Examples of the shape other than the cylindrical shape include elliptic cylindrical, prismatic, truncated cone, truncated elliptic cone, and truncated prism shapes, and other shapes.

The inner diameter of the cavities 26 is preferably 5 to 500 mm, and more preferably 30 to 300 mm. In the case where the inner diameter is below the above range, the inner diameter of the cavities 26 is extremely small. Consequently, the molten material poured into the cavities 26 will be rapidly cooled, which may easily result in cracking of the cast rods. Further, in this case, since the outer diameter of the cast rods is also extremely small, the mechanical strength of the cast rods is reduced, and the cast rods may crack. However, it is possible to prevent the cast rods from cracking by preheating the segments 14 forming the cavities 26. On the other hand, when the inner diameter exceeds the above range, the absolute amount of volume expansion associated with the solidification of the molten material becomes large. Consequently, the pressure in the cavities 26 is increased in association with the expansion, which may easily result in deformation or breakage of the cast rods.

In the case where the mold 10 for forming cast rods is a mold for forming cast rods for use in continuous supply to a vapor evaporation source in vapor deposition, the inner diameter of the cavities 26 is preferably set at 30 to 100 mm. Within this range, cast rods that are hard to break and easy to melt can be produced.

In the case where cast rods having a shape other then the cylindrical shape are produced, the shape of the cavities may be set such that the area thereof measured on a cross section orthogonal to the longitudinal direction is approximately equal to the cross-sectional area of the cylindrical cavity 26.

The length of the cavities 26 is preferably 50 to 2000 mm. When the length exceeds the above range, the segments 14 may easily deform or the cast rod may easily break due to the gravity of the molten material poured into the cavities 26.

On the other hand, when the length is excessively large as compared to the inner diameter of the cavities 26, the cast rods may easily crack. For this reason, the length of the cavities 26 is, for example, preferably 30 times or less as much as the inner diameter, and preferably is 20 times or less.

For the material for forming the segments 14, in view of the necessity of withstanding the thermal load applied thereto during molten material pouring, a material that is thermally stable and capable of sufficiently maintaining its mechanical strength under the casting conditions of cast rods is used. For example, at least one metal selected from the group consisting of tungsten, molybdenum, iron, and nickel, or alternatively an alloy containing a metal selected from the foregoing group is used.

The segments 14 constituting the segment assembly 12 are bonded together at the portions adjacent to each other with an adhesive having a decomposition point of 500° C. or less.

In this case, before molten material pouring into the cavities 26, the segments 14 can be held in a properly aligned state by bonding, and the handleability of the segment assembly 12 can be improved. In addition, the above adhesive, because of its decomposition point of 500° C. or less, is readily decomposed by the heat from the molten material, and thus the bonding between the segments 14 is readily dissolved by the molten material pouring into the cavities 26.

Examples of the adhesive having a decomposition point of 500° C. or less include an organic adhesive, such as an epoxy adhesive and a synthetic rubber adhesive, and the like.

The mold 10 for forming cast rods includes four pairs of leaf springs in total comprising a first pair of leaf springs 18, a second pair of leaf springs 19, a third pair of leaf springs 20, and a fourth pair of leaf springs 21.

Two leaf springs 30 and 32 of the first pair of leaf springs 18 are sandwiching the segment assembly 12 from the front side and the back side thereof, to fasten the segment assembly 12 in the front-and-rear direction 22. Two leaf springs 30 and 32 of the second pair of leaf springs 19 act in the same manner as the two leaf springs 30 and 32 of the first pair of leaf springs 18. The first pair of leaf springs 18 and the second pair of leaf springs 19 are arranged so as to be spaced apart from each other in the longitudinal direction 16.

On the other hand, two leaf springs 30 and 32 of the third pair of leaf springs 20 and two leaf springs 30 and 32 of the fourth pair of leaf springs 21, respectively, are sandwiching the segment assembly 12 from the both sides thereof, to fasten the segment assembly 12 in the right-and-left direction 24. The third pair of leaf springs 20 and the fourth pair of leaf springs 21 are arranged so as to be spaced apart from each other in the longitudinal direction 16.

Each pair of these four pairs of leaf springs (18 to 21) clamps the segment assembly 12 in a direction orthogonal to the longitudinal direction 16. Further, when a stress acting to expand the cavities 26 in directions orthogonal to the longitudinal direction 16 is generated in association with the expansion of the molten material, each pair of leaf springs allows a movement of the segments 14 so as to be spaced apart from each other in directions orthogonal to the longitudinal direction 16 such that the stress generated is counterbalanced with a clamping force applied to the segment assembly 12.

The clamping means in the mold 10 for forming cast rods comprises pairs of springs such as pairs of leaf springs (18 to 21). As such, it is possible to appropriately adjust the degree of clamping of the segment assembly 12 in directions orthogonal to the longitudinal direction 16 before molten material pouring the into the cavities 26 and the degree of movement of the segments 14 that occurs when a stress acting to expand the cavities 26 in directions orthogonal to the longitudinal direction 16 is generated in association with the expansion of the molten material.

As such, in the event of the generation of the stress as described above, the internal dimensions of the cavities 26 can become large, and thus the stress to be applied to the segments 14 and the cast rods in the cavities 26 can be reduced. On the other hand, during the pouring of the molten material into the cavities 26, the formation of the gaps between the segments 14 forming the cavities 26 can be prevented, and thus unexpected leaks of molten material from the cavities 26 can be reduced.

Between the two leaf springs 30 and 32 of the first pair of leaf springs 18 are disposed guide rods 36, one each at the both ends of the leaf spring in the right-and-left direction 24. On each of the ends of the guide rod 36 is disposed a fixing member 38 for preventing the falling off of the guide rod 36.

The two leaf springs 30 and 32 are fastened in the front-and-rear direction 22 by the guide rods 36 and the fixing members 38, and fixed in such a state that the surfaces of the leaf springs 30 and 32 are in contact with the outer circumference surface of the segment assembly 12.

As for the two leaf springs 30 and 32 of the second pair of leaf springs 19, as in the case of the first pair of leaf springs 18, the guide rods 36 are disposed one each at the both ends in the right-and-left direction 24, and on each of the ends of the guide rod 36 is disposed the fixing member 38.

Two sets of two leaf springs 30 and 32 of the third pair of leaf springs 20 and the fourth pair of leaf springs 21 are fixed in the same manner as the first pair of leaf springs 18 and the second pair of leaf springs 19 except that the direction in which the guide rods 36 are disposed and the direction in which the segment assembly 12 is clamped are the right-and-left direction 24, in such a state that the surfaces thereof are in contact with the outer circumference surface of the segment assembly 12.

The degree of clamping force for clamping the segment assembly 12 by four sets of the pairs of leaf springs (18 to 21) may be appropriately set according to the degree of expansion of the molten material when solidified, specifically, according to the expansion coefficient of the metal or alloy to be the molten material, the absolute amount of expansion that will vary depending on the inner diameter or length of the cavities 26, and the like.

The number of the pair of leaf springs, the material and size of the leaf springs, and the like may be appropriately set according to the above-described degree of clamping force required for casting.

Examples of the clamping means other than the pair of leaf springs includes a pair of compression springs such as compression coil springs and a pair of fluid springs such as air springs.

Alternatively, the clamping means may be, for example, a band-like member that surrounds outer circumference surface of the segment assembly 12 and clamp the segment assembly 12 in directions orthogonal to the longitudinal direction 16.

In the case where compression springs or fluid springs are used as the clamping means, for example, the clamping force by the clamping means may be uniformly applied to the outer circumference surface of the segment assembly 12, or alternatively, the clamping force may be individually applied to the juxtaposed segments 14.

The clamping force can be uniformly applied by, for example, placing board materials in contact with the outer circumference surface of the segment assembly 12 such that the board materials traverse the juxtaposed segments 14 in the front-and-rear direction 22 or the right-and-left direction 24, and then on the surfaces of the board materials, placing the springs in contact therewith.

In the case where the springs are placed in contact with the juxtaposed plurality of segments 14 one by one on the outer circumference surface of the segment assembly 12, the degree of clamping force can be varied depending on the locations of the segments 14 such that, for example, a weak clamping force is applied to the segments 14 located in the center in the front-and-rear direction 22 or the right-and-left direction 24, and a strong clamping force is applied to the segments located in the both ends.

In addition, to each pair of leaf springs (18 to 21), a securing bolt 40 for securing the leaf springs to the surfaces of the segments 14 is provided in order to maintain the relative position with the segment assembly 12 in the longitudinal direction 16 unchanged.

The number of points at which the leaf spring is secured to the surfaces of the segments 14 is set as small as possible. For example, when the number of securing points to the segments 14 is one per one leaf spring, the segments 14 that are not secured to the leaf spring are allowed to move in a sliding manner along the leaf spring while being held in contact therewith. As such, smooth movement of the segments 14 during the expansion due to the solidification of the molten material is possible.

The relative position of the segments 14 constituting the segment assembly 12 is held within a predetermined range by guide pins 42 piercing through the segments 14. The guide pins 42 regulate the movement of the segments 14 and prevent the segments 14 from being inadvertently displaced or fallen from the segment assembly 12.

Each of the guide pins 42 is provided with stopper members 44, one each at the both ends thereof. Examples of the stopper member 44 include a nut, and the like.

The segments 14 constituting the segment assembly 12 become spaced apart from each other when the molten material poured into the cavities expands when solidified, so that the internal dimensions of the cavities can become large. In view of this, there is provided a clearance 43 between the stopper members 44 and the outer circumference surface of the segment assembly 12 in a state before molten material pouring into the cavities.

The clearance 43 can be provided, as shown in FIG. 3B, by interposing a compression coil spring 45 and the like between the stopper member 44 and a circumference surface 12a of the segment assembly 12. The type, material, size, and the like of the compression coil spring 45 and the like may be suitably selected according to the degree of the expansion of the segments 14 associated with the pouring of the molten material, so that the amount of the clearance 43 can be set appropriately.

FIG. 3A illustrates five segments 14 disposed in the most rear of the segment assembly 12 in front view. Here, there five segments 14 include the foregoing first segment 14a and third segment 14c.

With reference to FIG. 3A, on the front surfaces of the five segments 14 except the cavity-forming portions, there appear guide bushes 46 for accommodating the guide pins 42.

The inner diameter of the guide bushes 46 is machined to a size slightly larger than that of the guide pins 42. For example, provided that the diameter of the guide pins 42 is 10 mm, the inner diameter of the guide bushes 46 is preferably 10.2 to 12 mm.

The segment 14 has a cut-out portion provided at a position that will be the center of a bottom 48 of the cavity 26. When four segments 14 are combined, the cut-out portion of each segment are combined to form a vent hole 50 for communicating the cavity 26 with the exterior, in the bottom side of the segment assembly 12.

The vent holes 50 serve as a passage of air when the air in the cavities is replaced with the molten material by the molten material pouring. Since the air is discharged from the vent holes 50, the entrapment of bubbles in the cast rods can be avoided.

The diameter of the vent holes 50 is not particularly limited but set to a size that is large enough to allow the air present in the cavities 26 to be easily discharged during molten material pouring and is small enough not to allow a large amount of the molten material poured into the cavities 26 to be flown out therefrom. It should be noted that since the molten material enters the vent holes 50, each cast rod will have a projection due to the vent hole 50 at the tip end thereof. This projection can be removed as needed after casting is completed by means of cutting, breaking, and the like.

If a large amount of the molten material poured into the cavities flows out from the vent holes 50 before the molten material is solidified, the vent holes 50 can be closed, for example, by foundry sand, and the like.

The cavities 26 may be provided with a draft so that the internal dimensions of the cavities become large from the bottom side of the segment assembly 12 toward a molten material pouring port. When such a draft is provided, the cast rods can be easily ejected from the segment assembly 12 after casting is completed.

On the surfaces of the cavity-forming portions 28 of the segments 14, a mold release agent may be applied. The applied mold release agent facilitates the removal of the cast rods from the segments 14, improving the efficiency in operation and the yield.

Examples of the mold release agent include various mold release agents containing alumina, silica, carbon, boron nitride, and the like.

Figure 5:
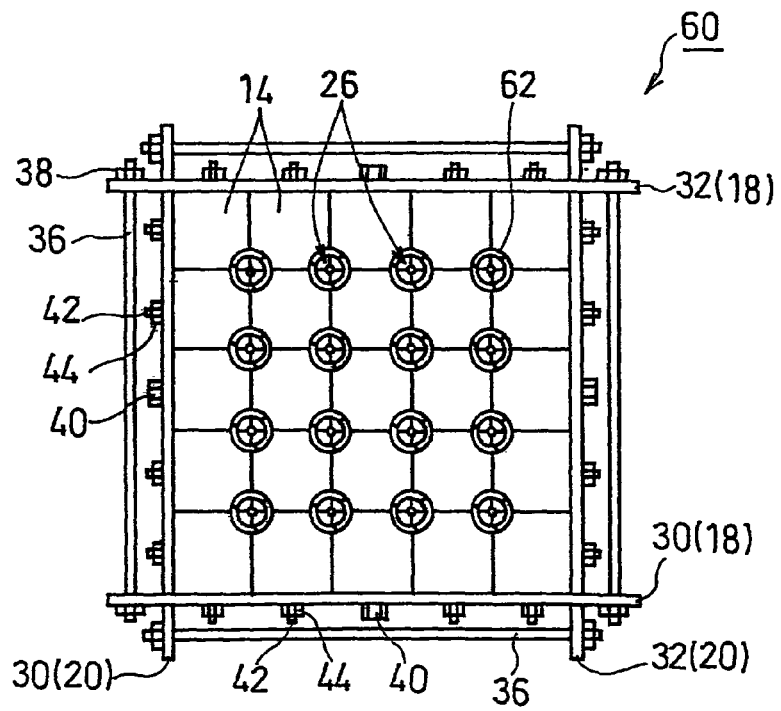
FIG. 5 is a plan view illustrating another embodiment of the mold for forming cast rods of the present invention.
Figure 6A:
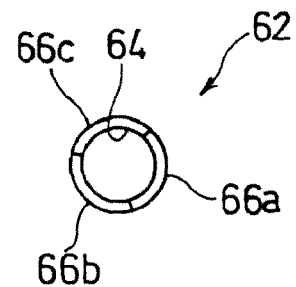
FIG. 6A is a plan view of the molten material contacting member illustrated in FIG. 5.
Figure 6B:
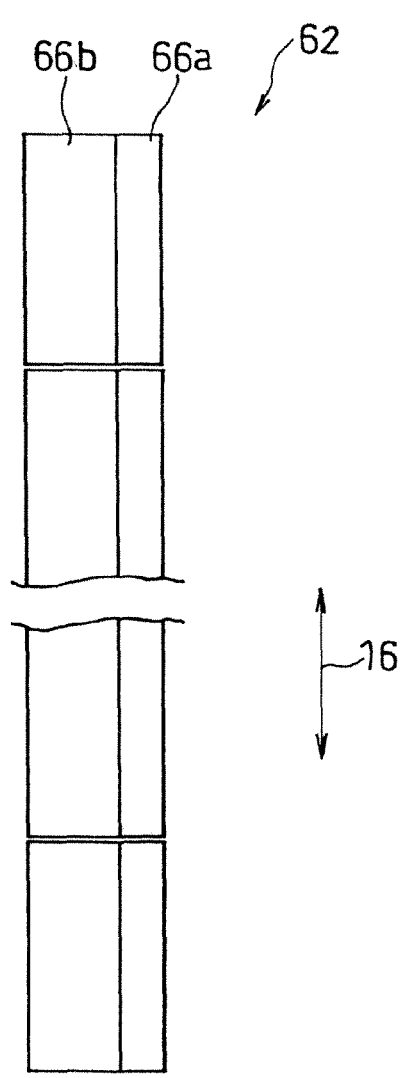
FIG. 6B is a front view of the molten material contacting member illustrated in FIG. 5.
Figure 7:
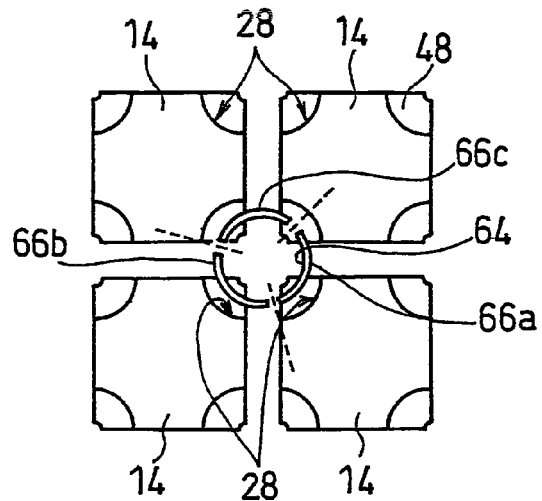
FIG. 7 is a partially enlarged exploded view of FIG. 5.

FIG. 5 is a plan view illustrating another embodiment of the mold for forming cast rods of the present invention. FIG. 6A is a plan view of the molten material contacting member illustrated in FIG. 5; and FIG. 6B is a front view of the molten material contacting member illustrated in FIG. 5. FIG. 7 is a partially enlarged exploded view of FIG. 5.

With reference to FIG. 5, a mold 60 for forming cast rods includes the segment assembly 12 including the plurality of columnar segments 14 placed side by side, and the clamping means (18 to 21) for clamping the segment assembly 12 in directions orthogonal to the longitudinal direction 16 of the segments 14. The mold 60 for forming cast rods is used by being mounted on the casting apparatus 90 (see FIG. 10) as described below.

Here, the same portions as those in the embodiment illustrated in FIG. 1 are denoted by the same reference numerals, and the descriptions thereof are omitted. This applies to the other embodiments described below.

The segment assembly 12 has sixteen columnar cavities 26 in total extending along the longitudinal direction 16 of the segments 14.

Each of the cavities 26 has a tubular molten material contacting member 62 on the surface of the cavity-forming portion. The molten material contacting member 62 has a cylindrical tubular shape and is disposed such that the outer circumference surface thereof is along the inner circumference surface of the cavity-forming portion 28 of the segment 14.

In the mold 60 for forming cast rods, the molten material is brought into contact with an inner surface 64 (see FIG. 6) of the molten material contacting member 62, and is not brought into contact with the inner circumference surface of the cavity-forming portion 28 of the segment 14. As such, the thermal load applied by the molten material to the segments 14 can be significantly reduced, and consequently, the durability of the mold 60 for forming cast rods can be improved.

With reference to FIG. 6A and FIG. 6B, the molten material contacting member 62 consists of segmental pieces (66a, 66b and 66c) by which the molten material contacting member 62 is divided into three with the cut cross sections thereof being parallel to the longitudinal direction 16.

As such, when the material poured as a molten material expands upon solidification, gaps are formed among the three segmental pieces (66a, 66b and 66c) constituting the molten material contacting member 62. By virtue of this, the stress applied to the molten material contacting member 62 and the cast rods can be reduced.

In this case, the releasability of the cast rods from the molten material contacting members can be further improved. Further, the segmental pieces can be spaced apart from each other when the molten material expands upon solidification, and the internal dimensions of the cavities for forming cast rods can be made large.

As the molten material contacting member, other than the one shown in FIG. 6, one divided into two along the longitudinal direction 16 of the segments 14 or one divided into four or more may be used.

With reference to FIG. 5 and FIG. 7, the molten material contacting member 62 is preferably disposed such that a divisional plane between the segmental pieces constituting the molten material contacting member 62 is displaced from a boundary between the segments 14 forming the cavity, so that the divisional plane and the boundary do not appear on the same plane. With this configuration, if the molten material leaks from the divisional plane between the segmental pieces during casting, there is little or no risk that such leaks may lead to leaks of the molten material from all over the mold.

With reference to FIG. 6B, the molten material contacting member 62 is divided into two or more blocks along a cut cross section perpendicular to the longitudinal direction 16. The molten material contacting member 62, which is formed in conformity with the shape of the cavity, is a long slender tubular member as a whole. As such, the handleability thereof is improved by dividing it into two or more blocks along a cut cross section perpendicular to the longitudinal direction 16.

As the material for forming the molten material contacting member 62, in view of improving the thermal resistance during molten material pouring and the releasability of the cast rods from the molten material contacting members, or in view of reducing the costs for the molten material contacting members, it is preferable to use a carbon material, a ceramic material including silica, alumina or zirconia, a sand-like material such as cement, and the like.

For the molten material contacting member 62, a material capable of withstanding the thermal load during molten material pouring is used. Such a material is, for example, a carbon material, for example, ceramic including silica, alumina or zirconia, for example, cement, and the like.

In this case, the thermal load that the mold for forming cast rods undergoes during molten material pouring can be reduced.

On the inner surfaces of the molten material contacting member 62 and a high-melting-point metal layer, a mold release agent may be applied. The applied mold release agent facilitates the removal of the cast rods from the segments 14, improving the efficiency in operation and the yield. Examples of the mold release agent are the same as described above.

The molten material contacting member 62 preferably has the high-melting-point metal layer on its inner surface which will be brought into contact with the poured molten material, the metal layer being made of a metal having a high melting point, such as molybdenum and tantalum. This can reduce the thermal load applied to the segments 14 and the molten material contacting members 62, and improve the durability of the mold 60 for forming cast rods and the releasability of the cast rods from the molten material contacting members 62.

The thickness of the high-melting-point metal layer is preferably, for example, about 0.1 to 0.5 mm, in view of the bendability and durability of the molten material contacting members 62.

The specific heat capacity of the molten material contacting members 62 is preferably 0.1 to 0.5 times as much as that of the molten material to be formed into cast rods, in view of stable casting.

When the specific heat capacity of the molten material contacting members is less than 0.1 times as much as that of the molten material to be formed into cast rods, the molten material contacting members undergo an abrupt change in temperature during molten material pouring, and may be broken. When the heat capacity of the portions composed of a molten material contacting material is more than 0.5 times as much as that of the cast rods, the cast rods are deprived of a large amount of heat by the portions composed of a molten material contacting material, and thus tend to become brittle.

It is preferable that the segmental pieces (66a, 66b and 66c) constituting the molten-material contacting member 62 are preferably bonded together at the portions adjacent to each other with an adhesive having a decomposition point of 500° C. or less.

In this configuration, before pouring the molten material into the cavities 26, the segmental pieces (66a, 66b and 66c) can be held in a secure manner by the adhesion, and thus the ease of handling of the molten-material contacting member 62 can be increased. In addition, since the adhesive has a decomposition point of 500° C. or less and is readily decomposed by the heat from the molten material, the segmental pieces (66a, 66b and 66c) are readily separated from each other when the molten material is poured into the cavities 26.

Examples of the adhesive having a decomposition point of 500° C. or less include an organic adhesive such as an epoxy-based adhesive and a synthetic rubber-based adhesive, and the like.

In the mold 10 for forming cast rods as illustrated in FIG. 1 and the mold 60 for forming cast rods as illustrated in FIG. 5, a heater and a temperature sensor may be incorporated into the interior of the segments 14. Using the heater and the temperature sensor and controlling the temperature of each segment 14 allows the molten material pouring to be performed on the basis of the temperature profile optimized according to the casting conditions of the cast rods. Further, incorporating the heater into the segments 14 allows an easy temperature control in the cooling process after molten material pouring.

In the mold for forming cast rods as illustrated in FIG. 5, a buffer layer made of foundry sand may be provided in the gap between the surface of the cavity-forming portion 28 of the segment 14 and the outer surface of the molten material contacting member 62. In this case, if the molten material leaks from the boundaries between the segments 14 adjacent to each other, the leaked molten material is absorbed by the buffer layer. As such, it is possible to prevent inadvertent leaks of the molten material from the portions other than the vent holes 50 in the segment assembly 12.

Figure 8:
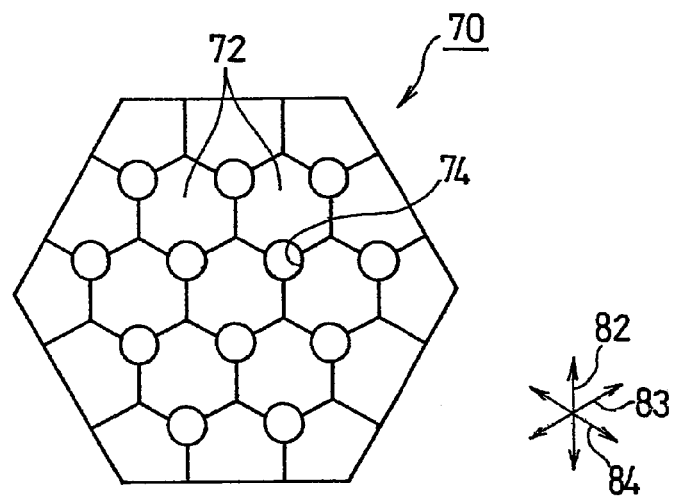
FIG. 8 is a plan view illustrating another embodiment of a segment assembly.
Figure 9:
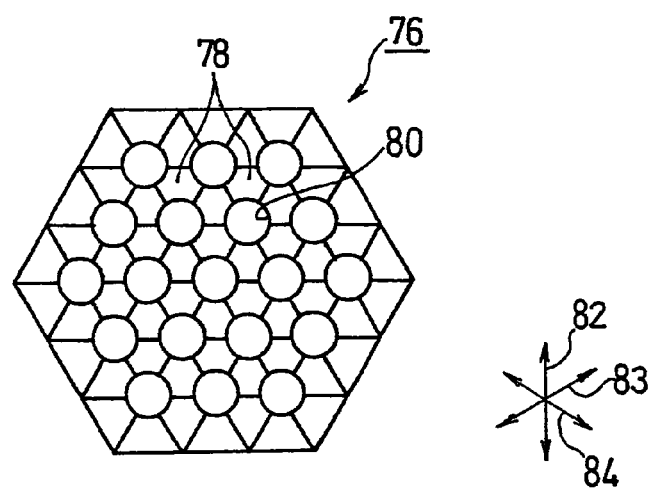
FIG. 9 is a plan view illustrating yet another embodiment of the segment assembly.

FIG. 8 and FIG. 9 are plan views illustrating other embodiments of the segment assembly in the mold for forming cast rods of the present invention.

With reference to FIG. 8, in a segment assembly 70, a plurality of columnar segments 72 are placed side by side. The segment assembly 70 includes the cylindrical cavities 26 extending along the longitudinal direction of the segments 72.

Each cavity 26 is formed by combining three segments 72. Each segment 72 has a cavity-forming portion 74 forming one third of the peripheral surface of the cavity 26. Each cavity-forming portion 74 corresponds to one of the portions equally dividing the peripheral surface of the cavity 26 into three on a cross section orthogonal to the longitudinal direction of the segment 72.

With reference to FIG. 9, in a segment assembly 76, a plurality of columnar segments 78 are placed side by side. The segment assembly 76 includes the cylindrical cavities 26 extending along the longitudinal direction of the segments 78.

Each cavity 26 is formed by combining six segments 78. Each segment 78 has a cavity-forming portion 80 forming one sixth of the peripheral surface of the cavity 26. Each cavity-forming portion 80 corresponds to one of the portions equally dividing the peripheral surface of the cavity 26 into six on the cross section orthogonal to the longitudinal direction of the segment 78.

The segment assemblies 70 and 76 illustrated in FIG. 8 and FIG. 9 are substantially hexagonal in plan view. Accordingly, when the segment assemblies 70 and 76 are each clamped with the clamping means in a direction orthogonal to the longitudinal direction of the segments, the clamping may be performed in three directions.

Specifically, the segment assemblies 70 and 76 are clamped in the following three directions: a first direction 82 corresponding to the direction in which the segment assemblies 70 and 76 are sandwiched from the front and the back; a second direction 83 corresponding to the direction in which the segment assemblies 70 and 76 are sandwiched from the front left and the rear right; and a third direction 84 corresponding to the direction in which the segment assemblies 70 and 76 are sandwiched from the front right and the rear left.

Even in the case where the segment assemblies 70 and 76 are each clamped in three directions (82 to 84) as described above, the segments 72 and 78 can be smoothly moved when a stress acting to expand the cavities 26 in directions orthogonal to the longitudinal direction is generated in association with the expansion of the molten material.

By virtue of this, the stress generated can be immediately counterbalanced with the clamping force applied to the segment assemblies 70 and 76 by the clamping means, and therefore the segments 72 and 78 and the cast rods can be prevented from being overstressed.

Figure 10:
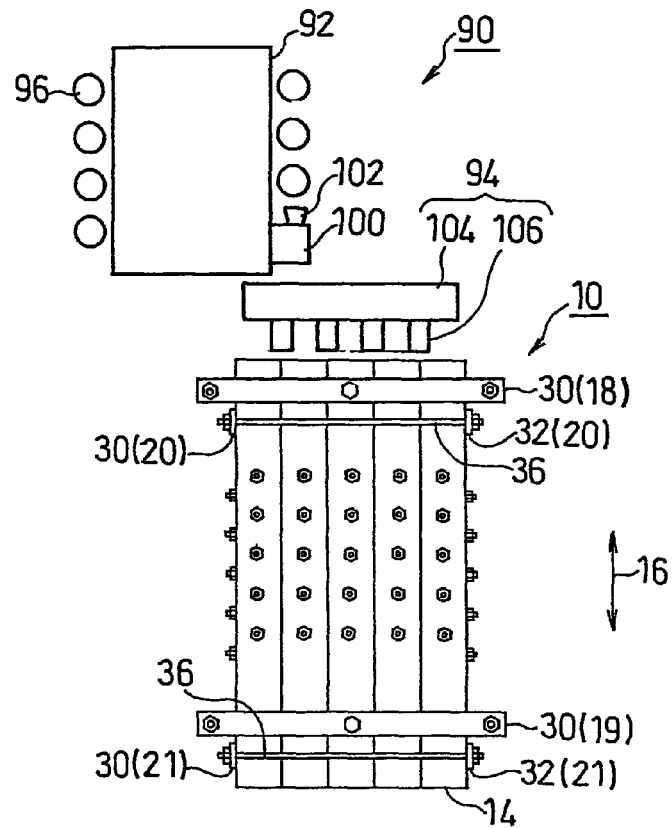
FIG. 10 is a front view illustrating an example of the casting apparatus of the present invention.
Figure 11:
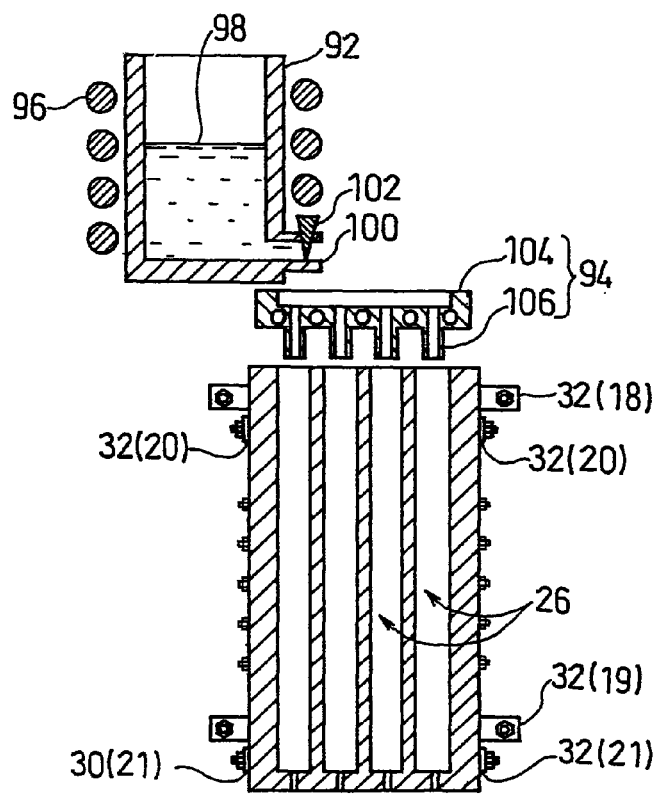
FIG. 11 is a cross-sectional view of FIG. 10.

FIG. 10 is a front view illustrating an embodiment of the casting apparatus of the present invention; and FIG. 11 is a cross-sectional view of FIG. 10.

With reference to FIG. 10 and FIG. 11, a casting apparatus 90 includes a melting furnace 92, a molten material pouring means 94, and the mold 10 for forming cast rods.

The melting furnace 92 includes a heating source 96 with a molten material 98 made of a material for forming cast rods being accommodated therein. When a stopper valve 102 provided at a molten material outlet 100 is opened, the molten material in the melting furnace 92 is poured into a receiver tray 104 in the molten material pouring means 94. Thereafter, the molten material 98 enters molten material dividing ports 106 from which the molten material is poured into the cavities in the mold 10 for forming cast rods.

The inner wall of the melting furnace 92 is formed from a high-melting-point oxide such as alumina, or alternatively a refractory material such as a carbon material. As the method of melting molten material by heating in the melting furnace 92, various methods may be used, for example, heating by heater, heating by burner, arc melting, and the like. Further, a high-temperature oxygen may be poured into the molten material in the vicinity of the molten material outlet 100, thereby to purify the molten material by removing residual carbon therefrom.

It is preferable to heat the receiver tray 104 with a heat source in order to prevent an excessive decrease in temperature of the molten material.

The mold 10 for forming cast rods is normally disposed such that the longitudinal direction 16 of the segments 14 is along the vertical direction. Alternatively, in order to allow the molten material to flow smoothly in the cavities, the longitudinal direction of the cavities may be slightly tilted with respect to the vertical direction.

In the production of cast rods using the casting apparatus 90 of the present invention, the molten material poured into the cavities in the mold 10 for forming cast rods reaches the vent holes 50 in the segment assembly 12 (see FIG. 2D and FIG. 3). However, since the diameter of the vent holes 50 is small as compared to that of the cavities, the molten material is cooled and solidified shortly after it reaches the vent holes 50. As such, although a very small amount of the molten material 98 is discharged from the vent holes 50 along with the gas in the cavities, a large amount of discharge can be prevented.

After the molten material pouring is completed by closing the stopper valve 102 at the molten material outlet 100, the molten material 98 poured into the cavities is gradually solidified from an area in which the temperature is lowered, and eventually formed into the cast rods that conform to the shape of the cavities. Since the cast rods expand as solidification proceeds, the segments 14 forming the cavities 26 are spaced apart from each other so that the internal dimensions of the cavities 26 become large, allowing the gaps to be formed between the segments (see FIG. 4).

In forming cast rods made of a material that expands when solidified, with the use of this mold 10 for forming cast rods, it is possible to reduce the stress associated with the expansion during solidification and prevent the breakage of the segments 14, the molten material contacting members 62 (see FIG. 5), and the cast rods. By virtue of this, the segments 14 and the molten material contacting members 62 can be used repeatedly.

As the mold for forming cast rods used in the foregoing casting apparatus 90, the mold for forming cast rods of the present in invention may be used without being limited to the one illustrated in FIG. 1.

According to the mold for forming cast rods, the casting apparatus, and the production method of cast rods of the present invention, it is possible to produce cast rods made of a material that expands when solidified, in an efficient manner and at low costs. Therefore, they can be suitably used in producing cast rods made of silicon and the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A mold for forming cast rods comprising: a segment assembly including a plurality of segments each having a columnar shape and being placed side by side, and a plurality of cavities extending along a longitudinal direction of the segments; and a clamping means for clamping the segment assembly in a direction orthogonal to the longitudinal direction of the segments, wherein
    each of the plurality of segments has one or more cavity-forming portions each forming a part of one of peripheral surfaces of the cavities,
    each of the cavities is formed by a combination of two or more of the segments,
    at least one of the plurality of segments has two or more cavity-forming portions, and
    said mold further comprising a molten material contacting member having a tubular shape and being disposed on a surface of the cavity-forming portion.

2. The mold for forming cast rods in accordance with claim 1, wherein the clamping means allows a movement of the segments so as to be spaced apart from each other in directions orthogonal to the longitudinal direction such that a clamping force applied to the segment assembly is counterbalanced with a stress acting to expand the cavities in directions orthogonal to the longitudinal direction.

3. The mold for forming cast rods in accordance with claim 1, wherein the clamping means clamps the segment assembly in two or more directions orthogonal to the longitudinal direction different from each other.

4. The mold for forming cast rods in accordance with claim 1, wherein each of the cavities is formed by a combination of three or more segments, and on a cross section orthogonal to the longitudinal direction, each of the cavity-forming portions of the segments forms less than one half of the peripheral surface of the cavity.

5. The mold for forming cast rods in accordance with claim 1, wherein each of the cavities is formed by a combination of four segments, and on a cross section orthogonal to the longitudinal direction, each of the cavity-forming portions of the segments equally divides the peripheral surface of the cavity into four.

6. The mold for forming cast rods in accordance with claim 1, wherein the segments are made of at least one metal selected from the group consisting of tungsten, molybdenum, tantalum, iron, and nickel, or alternatively an alloy containing a metal selected from the group.

7. The mold for forming cast rods in accordance with claim 1, wherein the segments adjacent to each other are bonded together with an adhesive having a decomposition point of 500° C. or less.

8. The mold for forming cast rods in accordance with claim 1, wherein the clamping means is a pair of springs disposed so as to oppose to each other in a direction orthogonal to the longitudinal direction with the segment assembly interposed therebetween.

9. The mold for forming cast rods in accordance with claim 8, wherein each of the pair of springs is a leaf spring.

10. The mold for forming cast rods in accordance with claim 8, wherein each of the pair of springs is a fluid spring.

11. The mold for forming cast rods in accordance with claim 1, wherein the molten material contacting member is divided into two or more segmental pieces along a cut cross section parallel to the longitudinal direction.

12. The mold for forming cast rods in accordance with claim 11, wherein in the combination of two or more of the segments forming one cavity, the bonded position between the segments is in contact with an outer surface of the molten material contacting member in a direction orthogonal to the longitudinal direction, and the cut cross section dividing the molten material contacting member is in contact with a surface of the cavity-forming portion of the segment at the outer surface of the molten material contacting member.

13. The mold for forming cast rods in accordance with claim 11, wherein each adjacent two of the segmental pieces are bonded together with an adhesive having a decomposition point of 500° C. or less.

14. The mold for forming cast rods in accordance with claim 1, wherein the molten material contacting member is divided into two or more along a cut cross section perpendicular to the longitudinal direction.

15. The mold for forming cast rods in accordance with claim 1, wherein the molten material contacting member is made of a carbon material, ceramic or cement.

16. The mold for forming cast rods in accordance with claim 1, wherein the molten material contacting member has on its inner surface a mold release agent.

17. The mold for forming cast rods in accordance with claim 1, wherein the molten material contacting member has on its inner surface a high-melting-point metal layer.

18. The mold for forming cast rods in accordance with claim 17, wherein the high-melting-point metal layer is made of at least one metal selected from the group consisting of tungsten, molybdenum, and tantalum, or alternatively an alloy containing a metal selected from the group.

19. The mold for forming cast rods in accordance with claim 17, wherein the high-melting-point metal layer has a thickness of 0.1 to 0.5 mm.

20. The mold for forming cast rods in accordance with claim 1, wherein a specific heat capacity of the molten material contacting member is 0.1 to 0.5 times as much as that of the molten material.

21. The mold for forming cast rods in accordance with claim 1, wherein the molten material is a molten metal or alloy having a density of solid phase at room temperature smaller than a density of liquid phase at a temperature close to a solidification point.

22. A casting apparatus comprising:
    a melting furnace for preparing a molten material made of a material for forming cast rods;
    the mold for forming cast rods of claim 1 for forming cast rods; and a molten material pouring means for pouring the molten material into each of the cavities in the mold for forming cast rods from the melting furnace.

23. A production method of cast rods comprising the steps of: pouring a molten material of a metal or alloy having a density of solid phase at room temperature smaller than a density of liquid phase at a temperature close to a solidification point into each of the cavities in the mold for forming cast rods of claim 1; and solidifying the molten material.

* * * * *